Patented Aug. 14, 1945

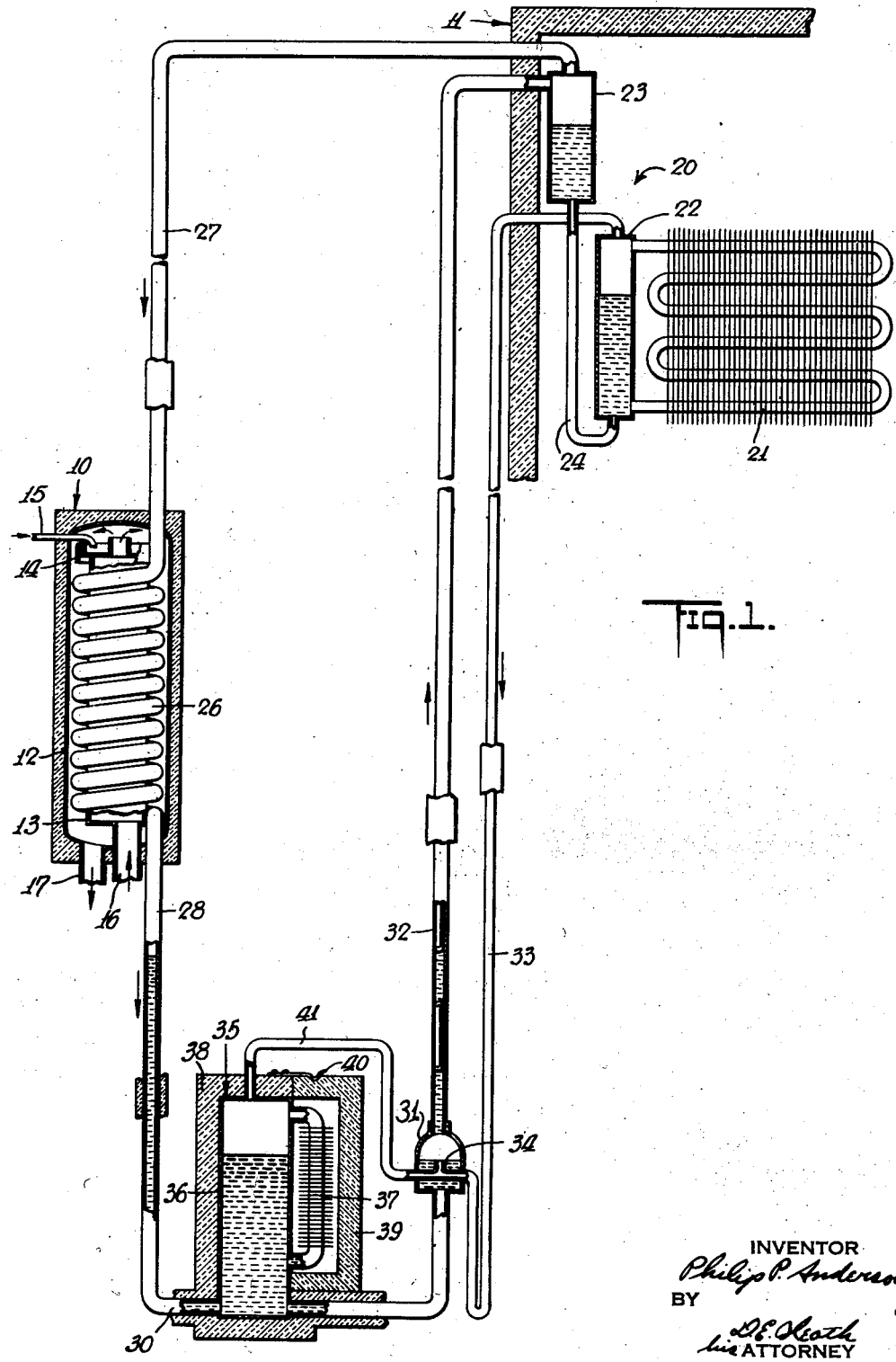

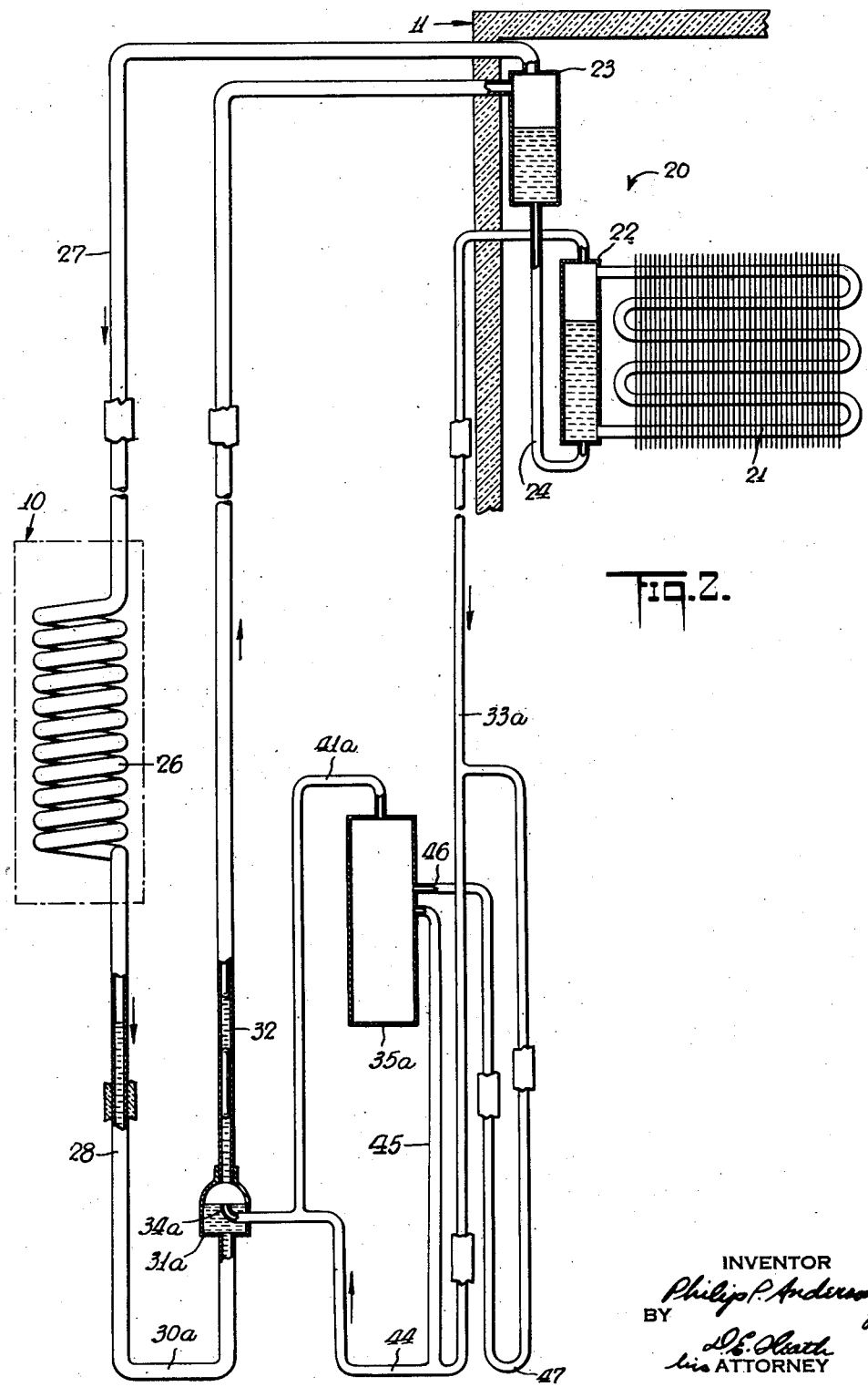

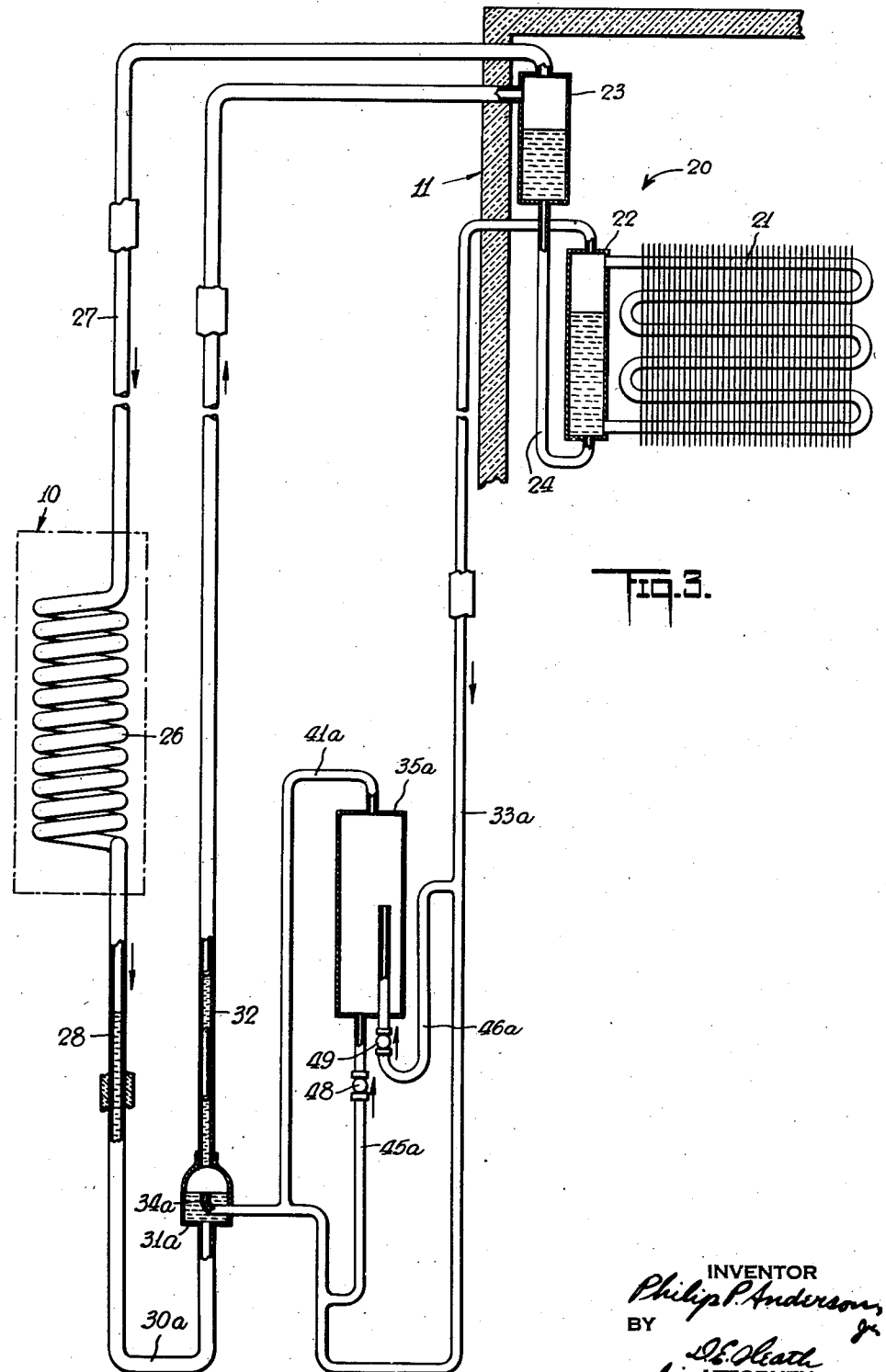

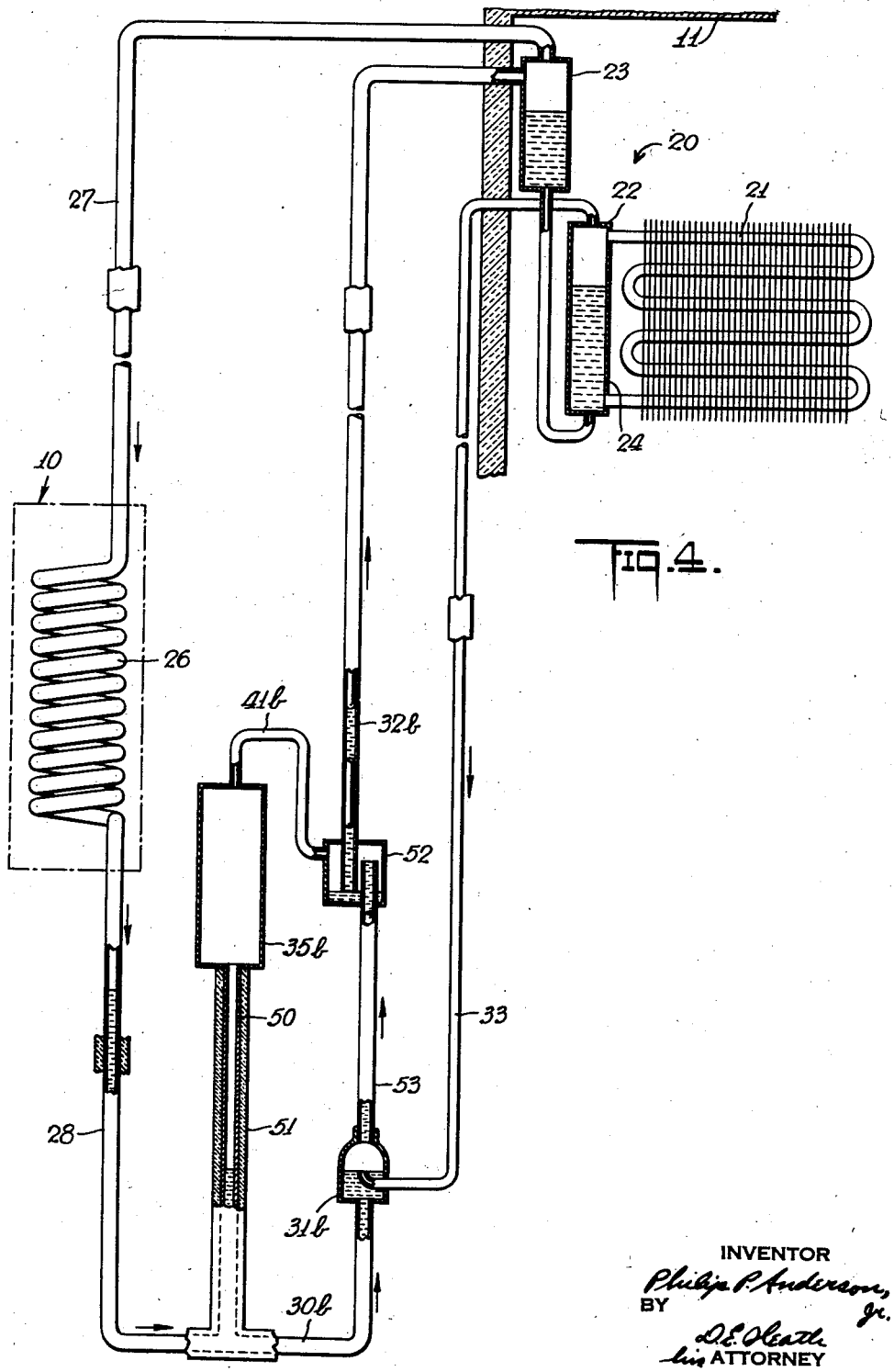

2,382,123

UNITED STATES PATENT OFFICE 2,382,123

REFRIGERATION

Philip P. Anderson, Jr., Evansville, Ind., assignor to Servel, Inc., New York N. Y., a corporation of Delaware Application July 19, 1941, Serial No. 403,152

17 Claims. (Cl. 62—125)

This invention relates to refrigeration, and more particularly to raising volatile liquid in a system for transferring heat to effect cooling at a region above a source of refrigeration.

In certain types of vaporization-condensation heat transfer systems, vapor from an elevated evaporator unit is utilized to raise liquid to said evaporator unit.

It is an object of this invention to provide for starting or continuing the operation of such a system when vapor from the evaporator is inadequate.

This is accomplished by providing an auxiliary source of lifting vapor which may be brought into operation at will or automatically as will more fully appear in the following description in connection with the accompanying drawings, of which:

Fig. 1 is a more or less diagrammatic view partly in side elevation and partly in section of a cooling system embodying the invention, and incorporating a manually controllable auxiliary vapor source; and Figs. 2, 3 and 4 are also more or less diagrammatic views partly in side elevation and partly in section of cooling systems, embodying the invention, and incorporating different forms of automatically operable auxiliary vapor sources respectively.

Like reference characters denote like parts in the several figures of the drawings.

In Fig. 1, the invention is shown in connection with a uniform pressure absorption refrigerating system having an evaporator or cooling unit 10, which is located remotely below a heat insulated region or chamber 11 to be refrigerated, and which constitutes a source of refrigeration for said chamber. Evaporator 10 is a cylinder 13 enclosed in a heat insulated shell 12 and provided at its upper end with an annular tray 14 into which is delivered a suitable volatile liquid refrigerant such as ammonia by means of a pipe 15. Ammonia overflows from the tray 14 and passes downward over a coil 26.

Inert gas, such as hydrogen, is admitted into the cylinder 13 through an inlet 16 and flows upward to the top of the shell 12 and then downward on the outside of said cylinder. The ammonia evaporates and diffuses into the hydrogen, producing a refrigerating effect for cooling coil 26.

The mixture of ammonia vapor and hydrogen flows from the bottom of the shell 12 through an outlet 17, and is delivered to the other parts of the primary refrigerating system. These other parts may comprise generally an absorber into which the mixture of ammonia vapor and hydrogen is delivered for absorption of the ammonia into a liquid absorbent such as water. The separated inert hydrogen gas is returned to the cylinder 13 through the inlet 16, while the enriched absorption liquid is conducted to a generator. Ammonia is then expelled from the absorption solution by heating of the generator. This expelled ammonia is liquefied in a condenser, and then returned to the evaporator unit 10 through the conduit 15 to complete the cycle in the primary refrigerating system. The weakened absorption solution from which the ammonia has been expelled is conducted from the generator to the absorber to absorb ammonia gas.

For further description of the primary refrigerating system, reference may be had to Patent No. 2,207,838 of A. R. Thomas, granted July 16, 1940.

A system for transferring the heat from the storage chamber 11 to be cooled to the primary evaporator unit 10 includes an evaporator unit 20 disposed in said chamber and comprising a finned coil 21 connected to a header 22. A separating vessel or surge tank 23 is disposed above said header 22 and has a liquid line 24 to said header. This system also includes coil 26, forming with the evaporator unit 20 part of a closed fluid circuit containing a suitable volatile fluid such as methyl chloride.

Vapor flows from the surge tank 23 downward through a conduit 27 into the upper end of the condenser coil 26 where it is cooled and condensed by the primary evaporator unit 10. Condensation of vapor in coil 26 causes evaporation of the liquid in the evaporator unit 20, and resultant cooling of the storage chamber 11.

Since the condenser 26 is at a lower level than the evaporator unit 20, means is provided to return the condensate liquid in the secondary heat transfer system from said condenser to said evaporator unit for continuous operation of the system. The condensate in the system shown in Fig. 1 flows by gravity from the condenser 26 into a stand pipe 29, and by static pressure through a bend 30 into the bottom or inlet side of a vapor lift chamber 31. The top or outlet side of chamber 31 is connected to the tank 23 through a riser or lift pipe 32.

In order to raise liquid in the pipe 32 into the tank 23 during normal operation shown in Fig. 1, there is provided a main vapor lift device comprising a vapor line 33 having its upper end connected to the vapor space of the evaporator header 22, and having its lower end connected to a nozzle 34 in the pump chamber 31. Vapor from the evaporator header 22 is delivered through the vapor line 33 into the pump chamber 31 where it bubbles into the liquid. The resultant mixture of liquid and vapor in the pump chamber 31 and lift pipe 32 has a lower specific gravity than that of the liquid alone, with the result that this mixture is raised through said lift pipe to the tank 23 in known manner.

Under certain conditions, as, for instance, during a shut-down period, all of the liquid in the system may distill into the condenser unit 26, thereby flooding the lower part of the system and leaving no source of vapor in the evaporator unit 20 for lifting. In order to restart operation when such flooding occurs, there is provided in the system of Fig. 1 a manually controllable auxiliary vapor source comprising a vaporizing vessel 35 having a main section 36, shown in the form of an upright cylinder with inlet and outlet liquid connections to the line 30, and a finned loop section 37 forming a pipe connection between the upper and lower parts of the cylinder 36. Cylinder 36 and its connections are permanently covered with suitable heat insulation 38, while the pipe loop 37 is covered with a block of heat insulation 39 removably fastened in position by suitable means as for instance spring clips 40. A vapor pipe 41 is connected at one end to the upper end of the vaporizing vessel 35, and at the other end extends into the pump chamber 31 and is there connected to the nozzle 34.

Whenever the lower part of the system becomes flooded, the insulation block 39 may be removed so that the thus exposed pipe loop 37 is heated. This heat may come from the surrounding air, or it may be supplied from a suitable source of heat such as an electric heater. The resultant vapor flows through pipe 41 to the nozzle 34 of the lift chamber 31, where it picks up slugs of liquid and delivers them through the riser pipe 32 into the tank 23 by vapor lift action. After a sufficient quantity of liquid has been transferred to the tank 23 in this manner, the insulation block 39 around the pipe loop 38 is replaced and normal operation is resumed.

Fig. 2 shows a cooling system which in certain aspects is similar to that shown in Fig. 1, but which has an auxiliary vapor lifting device automatically operable when the lower part of the system becomes flooded by distillation of the refrigerant from the evaporator 20. The main vapor lift device in the system of Fig. 2 comprises a vapor lift chamber 31a into which the condensate flows from the condenser 26 by way of the stand pipe 28 and bend 30a. The top or outlet side of chamber 31a is connected to the tank 23 through the riser or lift pipe 32. For raising liquid in the pipe 32, a vapor line 33a leading from the evaporator header 22 and having a bend 44 extends into the chamber 31a and terminates in an upturned nozzle 34a. During normal operation, the system shown in Fig. 2 operates the same as that shown in Fig. 1.

The auxiliary vapor source for automatically restarting normal operation after flooding of the system comprises an uninsulated vaporizing vessel 35a and a vapor line 41a connected at one end to the upper section of said vessel, and connected at its other end to the vapor line 33a near the lift chamber 31a. Connected between vessel 35a and the vapor line 33a is a pipe 45. The connecting point between pipe 45 and the vaporizing vessel 35a is above the normal operating level of the liquid in the lower part of the system, so that liquid does not enter said vessel during normal operation. Connected between the vessel 35a above the pipe 45 and the vapor line 33a is a second pipe 46 having a downward loop 47.

When the lower part of the system shown in Fig. 2 begins to flood, liquid from the lift chamber 31a flows into the vapor line 33a and rises therein and in pipe 45 until it overflows through said latter pipe into the vessel 35a. As the liquid level rises in the vessel 35a, the vapors in said vessel are vented through the pipe 46 until the liquid level reaches said pipe and overflows therein into the bend or trap 47 to seal said pipe. Since the vessel 35a is uninsulated and therefore exposed to the heat of the surrounding air, vapor is formed in said vessel, and this vapor acts to depress the liquid levels in the pipes 41a, 45, and 46. Vapor from the vessel 35a passes through the line 41a and into the nozzle 34a in the lift chamber 31a, and bubbles into the liquid in said chamber and the riser pipe 32 to lift liquid in said pipe to the tank 23. During this action, the liquid seal in the trap 47 prevents flow of the vapors generated in the vessel 35a through the pipe 46. After a sufficient quantity of liquid has been transferred to the tank 23 by the auxiliary vapor source as described, normal vapor lift operation through the pipes 33a and 32 is automatically resumed. Vapor from the line 33a is delivered for liquid lifting action to the nozzle 34a through the bend 44 in the lower part of the pipe 33a and also through the pipes 45 and 46, vessel 35a, and line 41a.

Fig. 3 shows an auxiliary vapor source similar to that of Fig. 2, except that the line 45a corresponding to the line 45 in Fig. 2 is connected to the bottom of the uninsulated vessel 35a and has a check valve 48 therein, and the line 46a corresponding to the line 46 in Fig. 2 projects upward in said vessel and is provided with a non-loaded free floating check valve 49 which closes only when subjected to pressure flow. These check valves 48 and 49 only permit pressure flow therethrough in the directions indicated.

The bottom of the vaporizing vessel 35a is above the normal operating level of the liquid in the lower part of the system so that liquid does not enter said vessel during normal operation.

When the lower part of the system shown in Fig. 3 is flooded, liquid rises in the pipe 45a, passes through the check valve 48, and enters vessel 35a. As the level rises in the vessel 35a, vapor is vented through the pipe 46a due to the non-loaded character of the check valve 49. When the liquid level reaches the upper open end of the pipe 46a, the liquid overflows into said pipe and closes check valve 49.

The liquid collected in the vessel 35a cannot back flow through the pipe 45a because of the check valve 48. Vapor generated in vessel 35a as the result of the exposure of said vessel to the heat of the surrounding air flows through the pipe 41a and into the nozzle 34a. This causes liquid to be raised through the pipe 32 and into the tank 23 until sufficient liquid has been collected in the evaporator unit 20 to resume normal vapor lifting operation.

Fig. 4 shows a system with an automatically operative auxiliary vapor source comprising an uninsulated vaporizing vessel 35b having a pipe connection 50 between the bottom thereof and the bend 30b which is covered up to said vessel by suitable heat insulation 51. The elevation of vessel 35b is such that the bottom thereof is substantially at the same level as the level of the liquid in the pipe 28 during normal operation when the evaporator 20 contains liquid. A vapor line 41b is connected at one end to the upper part of the vaporizing vessel 35b, and at the other end to an auxiliary vapor lift chamber 52. A riser pipe 32b projects at its lower end into chamber 52, and is connected at its upper end to the upper part of the tank 23.

A main vapor lift chamber 31b, disposed below the auxiliary pump chamber 52, is connected at the bottom to the pipe bend 30b, and at the top to the lower end of a lift pipe 53. The upper end of lift pipe 53 projects into the chamber 52 above the lower end of pipe 32b in said chamber. The vapor line 33 from the evaporator header 22 projects into the main lift chamber 31b and terminates in an upward directed nozzle therein.

During normal operation, vapor from the line 33 bubbles into he liquid in the main lift chamber 31b and line 53 so that said liquid is lifted into the auxiliary lift chamber 52 and then through the riser pipe 32b into the tank 23.

When the liquid in the evaporator 20 is all distilled, the pressure in the vaporizing vessel 35b is substantially the same as that in the condenser 26, so that the level of the liquid in the pipe 50 rises substantially to the same level as that in the pipe 28. When the lower part of the system becomes flooded, the liquid rises in the vaporizing vessel 35b. Since the vessel 35b is exposed to the heat of the surrounding air, the liquid in said vessel is vaporized. The resultant vapor flows through the pipe 41b into the auxiliary lift chamber 52 where it causes liquid in said chamber to be lifted through the riser pipe 32b into the tank 23. After a sufficient quantity of liquid has been transferred to tank 23, normal vapor lifting operation will be resumed.

Although the heat insulation on some of the parts of the system shown in Figs. 1 to 4, such as the pipes 27, 28, 30, 30a, 30b, 32, 32b, 33 and 33a, have not been shown, or are only fragmentally shown for the sake of simplicity, it must be understood that such parts are desirably insulated in accordance with good refrigeration practice.

As many changes could be made in the above system, and many apparently widely different embodiments of this invention could be made without departing from the scope of the claims, it is intended that all matter contained in the above description or shown in the accompanying drawings shall be interpreted as illustrative and not in a limiting sense.

What is claimed is:

1. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator constituting a first source of lifting vapor, and means arranged to receive condensate flowing from the condenser by gravity and constituting a second source for supplying vapor to the lifting means to lift condensate into said evaporator when the vapor from said first source is diminished.

2. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator constituting a first source of lifting vapor, and means constituting a second source for supplying vapor to the lifting means for lifting condensate into said evaporator, said last-named means being operative responsive to a rise in the liquid level in the lower part of the system.

3. A cooling system comprising an evaporator in the upper part of the system, a condenser in the lower part of the system for effecting vaporization of volatile liquid refrigerant in said evaporator and condensation of the vaporized liquid in said condenser, means for lifting the condensate into said evaporator by application of vapor from said evaporator, means for generating vapor from said condensate in the lower part of the system when said lower part has become flooded, and means for applying said last vapor for lifting said condensate to said evaporator.

4. A cooling system comprising an evaporator, a condenser disposed below said evaporator for effecting vaporization of volatile liquid refrigerant in said evaporator and condensation of the vaporized liquid in said condenser, a vapor lift chamber in the lower part of said system receiving the condensate from said condenser, a riser between said chamber and said evaporator, said evaporator constituting a first source of vapor, means for applying vapor from said evaporator to said chamber to lift said condensate into said evaporator, and means arranged to receive condensate flowing from the condenser by gravity and constituting a second source for supplying vapor to said chamber to lift condensate into said evaporator when the vapor from said first source is diminished.

5. A cooling system comprising an evaporator, a condenser disposed below said evaporator for effecting vaporization of volatile liquid refrigerant in said evaporator and condensation of the vaporized liquid in said condenser, a vapor lift chamber in the lower part of said system receiving the condensate from said condenser, a riser between said chamber and said evaporator, means for applying vapor from said evaporator to said chamber to lift said condensate into said evaporator, a vaporizing vessel disposed in the lower part of the system in position to receive said condensate when said lower part has become flooded, and means for applying the vapor generated in said vessel to said chamber for lifting said condensate to said evaporator.

6. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator, said evaporator constituting a first source of vapor, and manually controllable means constituting a second source for supplying vapor to the lifting means to lift condensate into said evaporator when the amount of lifting vapor formed at said first source is diminished.

7. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator, a vaporizing vessel disposed in the lower part of the system in position to receive condensate, heat insulation around said vessel, at least a portion of said insulation being removably supported to permit exposure of a corresponding portion of said vessel to vaporizing heat, and means for applying the vapor generated in said vessel for lifting said condensate to said evaporator.

8. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator, a vaporizing vessel having a main section and a loop conduit section, heat insulation around said vessel, the portion of said insulation around said loop section being removable to permit exposure of said latter section to vaporizing heat, and means for applying the vapor generated in said vessel for lifting the condensate to said evaporator.

9. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator, said evaporator constituting a first source of vapor, and means constituting a second source for supplying vapor to the lifting means to lift condensate into said evaporator, said means being operative responsive to decrease of liquid in said evaporator and an increase of liquid condensate from the condenser.

10. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator, a vaporizing vessel in the lower part of the system arranged to receive condensate only when said lower part has become flooded beyond a predetermined level, said vessel being uninsulated and exposed to heat from surrounding atmosphere, and means for applying the vapor generated in said vessel to lift the condensate to said evaporator.

11. A cooling system comprising an evaporator, a condenser disposed below said evaporator for effecting vaporization of volatile liquid refrigerant in said evaporator and condensation of the vaporized liquid in said condenser, a vapor lift chamber in the lower part of said system receiving the condensate from said condenser, a riser between said chamber and said evaporator, means for applying vapor from said evaporator to said chamber to lift said condensate through said riser into said evaporator, a vaporizing vessel disposed in the lower part of the system so as to receive condensate only when said lower part has become flooded beyond a predetermined level, said vessel being uninsulated and exposed to heat from surrounding atmosphere, and means for applying the vapor generated in said vessel to said chamber to lift the condensate through said riser into said evaporator.

12. A cooling system comprising an evaporator, a condenser disposed below said evaporator for effecting vaporization of volatile liquid refrigerant in said evaporator and condensation of the vaporized liquid in said condenser, means for lifting the condensate into said evaporator by application of vapor from said evaporator, a vaporizing vessel disposed in the lower part of the system, means for admitting condensate into said vessel only when said lower part becomes flooded beyond a predetermined level, and means for applying the vapor generated in said vessel for lifting the condensate to said evaporator.

13. A cooling system comprising an evaporator, a condenser disposed below said evaporator for effecting vaporization of volatile liquid refrigerant in said evaporator and condensation of the vaporized liquid in said condenser, a vapor lift chamber in the lower part of said system receiving the condensate from said condenser, a riser between said chamber and said evaporator, a vapor line from said evaporator to said chamber to lift said condensate through said riser into said evaporator, a vaporizing vessel disposed in the lower part of the system, a pair of connections between said vessel and said vapor line, one of said connections serving as a means for delivering condensate into said vessel when the lower part of said system has become flooded beyond a predetermined level, and the other connection serving as a vent for said vessel as the level of the condensate in said vessel rises, means for preventing the generated vapor in said vessel from escaping through said connections, and a vapor line for delivering the generated vapor from said vessel to said chamber for vapor lifting operation.

14. A cooling system comprising an evaporator, a condenser disposed below said evaporator for effecting vaporization of volatile liquid refrigerant in said evaporator and condensation of the vaporized liquid in said condenser, a vapor lift chamber in the lower part of said system receiving the condensate from said condenser, a riser between said chamber and said evaporator, a vapor line from said evaporator to said chamber to lift said condensate through said riser into said evaporator, a vaporizing vessel disposed in the lower part of the system, a pair of connections between said vessel and said vapor line, one of said connections serving as a means for delivering condensate into said vessel when the lower part of said system has become flooded beyond a predetermined level, and the other connection serving as a vent for said vessel as the level of the condensate in said vessel rises, liquid seal traps in said connections respectively for preventing the generated vapor in said vessel from escaping through said connections, and a vapor line for delivering the generated vapor from said vessel to said chamber for vapor lifting operation.

15. A cooling system comprising an evaporator, a condenser disposed below said evaporator for effecting vaporization of volatile liquid refrigerant in said evaporator and condensation of the vaporized liquid in said condenser, a vapor lift chamber in the lower part of said system receiving the condensate from said condenser, a riser between said chamber and said evaporator, a vapor line from said evaporator to said chamber to lift said condensate through said riser and into said evaporator, a vaporizing vessel disposed in the lower part of the system, a pair of connections between said vessel and said vapor line, one of said connections serving as a means for delivering condensate into said vessel when the lower part of said system has become flooded beyond a predetermined level, and the other connection serving as a vent for said vessel as the level of the condensate in said vessel rises, said connections having portions thereof constructed and arranged to prevent the generated vapor in said vessel from escaping through said connections, and a vapor line for delivering the generated vapor from said vessel to said chamber for vapor lifting operation.

16. A cooling system comprising an evaporator, a condenser disposed below said evaporator for effecting vaporization of volatile liquid refrigerant in said evaporator and condensation of the vaporized liquid in said condenser, a pair of vapor lift chambers in the lower part of the system, a conduit connecting said chambers, a riser between one of said chambers and said evaporator, means for applying vapor from said evaporator to the other of said chambers to lift the condensate into said evaporator, means for generating vapor in the lower part of the system when said lower part is flooded beyond a predetermined level, and means for delivering said last vapor to said first vapor lift chamber for vapor liquid lifting operation.

17. A method of cooling which includes simultaneously vaporizing liquid refrigerant at an upper station and condensing the vaporized refrigerant at a lower station, draining the condensate from the condenser, applying vapor generated at the upper station to the condensate from the lower station to lift said condensate to said upper station, generating vapor from part of the condensate draining from the condenser, and applying said vapor generated from the condensate draining from the condenser for lifting condensate to said upper station when the amount of lifting vapor formed at said upper station is diminished.

PHILIP P. ANDERSON, Jr.